United States Patent
Chao et al.

(10) Patent No.: US 7,425,800 B2
(45) Date of Patent: Sep. 16, 2008

(54) DEVICE FOR DRIVING A LIGHT SOURCE MODULE

(75) Inventors: Yu-Hsiao Chao, Tu-Cheng (TW);
Tsang-Chuan Lin, Tu-Cheng (TW);
Chi-Hsiung Lee, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/546,660

(22) Filed: Oct. 11, 2006

(65) Prior Publication Data

US 2007/0188108 A1 Aug. 16, 2007

(30) Foreign Application Priority Data

Feb. 10, 2006 (CN) .......................... 2006 1 003569

(51) Int. Cl.
*H05B 37/02* (2006.01)
(52) U.S. Cl. .................... 315/209 R; 315/276; 315/291
(58) Field of Classification Search ............ 315/209 R, 315/219, 224, 225, 226, 246, 276, 279, 291, 315/307, 308
See application file for complete search history.

(56) References Cited

U.S. PATENT DOCUMENTS

| | | | | |
|---|---|---|---|---|
| 5,365,152 A | * | 11/1994 | Ozawa et al. | 315/291 |
| 6,181,087 B1 | | 1/2001 | Hamaguchi et al. | 315/308 |
| 2004/0183476 A1 | * | 9/2004 | Ishizuka | 315/291 |
| 2006/0087259 A1 | * | 4/2006 | Fiorello | 315/291 |

* cited by examiner

*Primary Examiner*—Thuy Vinh Tran
(74) *Attorney, Agent, or Firm*—Morris Manning Martin LLP; Tim Tingkang Xia, Esq.

(57) ABSTRACT

A driving device for driving a light source module (32) includes a switch circuit (30), a transformer circuit (31), a voltage sensing circuit (34), a current sensing circuit (35), and a PWM controller (33). The switch circuit converts a received direct current (DC) power signal to an alternating current (AC) signal. The transformer circuit converts the AC signal to an appropriate signal to drive the light source module. The voltage sensing circuit receives the DC power signal and senses a voltage level of the DC power signal. The current sensing circuit receives the DC power signal and senses a current level of the DC power signal. The PWM controller controls the AC signal output from the switch circuit according to the sensed voltage and current levels.

17 Claims, 3 Drawing Sheets

DEVICE FOR DRIVING A LIGHT SOURCE MODULE

BACKGROUND

1. Field of the Invention

The invention relates to electronic driving devices, and particularly to a device for driving a light source module such as discharge lamps of a liquid crystal display (LCD) panel.

2. Related Art

Conventionally, discharge lamps such as cold cathode fluorescent lights (CCFLs) have been used as light sources for liquid crystal display (LCD) panels, and must be driven by high voltages. With larger LCD panels requiring a plurality of lamps, to achieve sufficient light intensity.

FIG. 3 is a conventional driving device for driving a light source module. The conventional driving device includes a switch circuit 10, a transformer circuit 11, a light source module 12, a feedback circuit 13, and a PWM controller 14. The switch circuit 10 converts a received direct current (DC) power signal to an alternating current (AC) signal. The transformer circuit 11 transforms the AC signal to an appropriate signal to drive the light source module 12. The feedback circuit 13 is connected between the light source module 12 and the PWM controller 14, for feeding back current flowing through the light source module 12 to the PWM controller 14. The PWM controller 14 controls the AC signal output from the switch circuit 10 based on the current output from the feedback circuit 13.

The feedback current is received from the light source module 12, and is sent to the driving device via an external circuit, thereby increasing the cost of an electronic device using the driving device.

FIG. 4 is another conventional driving device for driving a light source module. The driving device in FIG. 4 is substantially the same as that of FIG. 3, except that the feedback circuit 23 is connected between the transformer circuit 21 and the PWM controller 24, and the feedback current is received from the transformer circuit 21. Therefore, the feedback current is directly sent to the PWM controller 24 in the driving device without the need of the external circuit, and thus, costs of an electronic using the driving device can be reduced. However, the feedback current received from the transformer circuit 21 is unstable, and precision of the feedback current is deteriorated.

SUMMARY

A driving device for driving a light source module includes a switch circuit, a transformer circuit, a voltage sensing circuit, a current sensing circuit, and a PWM controller. The switch circuit converts a received direct current (DC) power signal to an alternating current (AC) signal. The transformer circuit converts the AC signal to an appropriate signal to drive the light source module. The voltage sensing circuit receives the DC power signal and senses a voltage level of the DC power signal. The current sensing circuit receives the DC power signal and senses a current level of the DC power signal. The PWM controller controls the AC signal output from the switch circuit according to the sensed voltage and current levels.

Other advantages and novel features will become more apparent from the following detailed description of preferred embodiments when taken in conjunction with the accompanying drawings, in which:

DETAILED DESCRIPTION OF EMBODIMENTS

Figure 1:
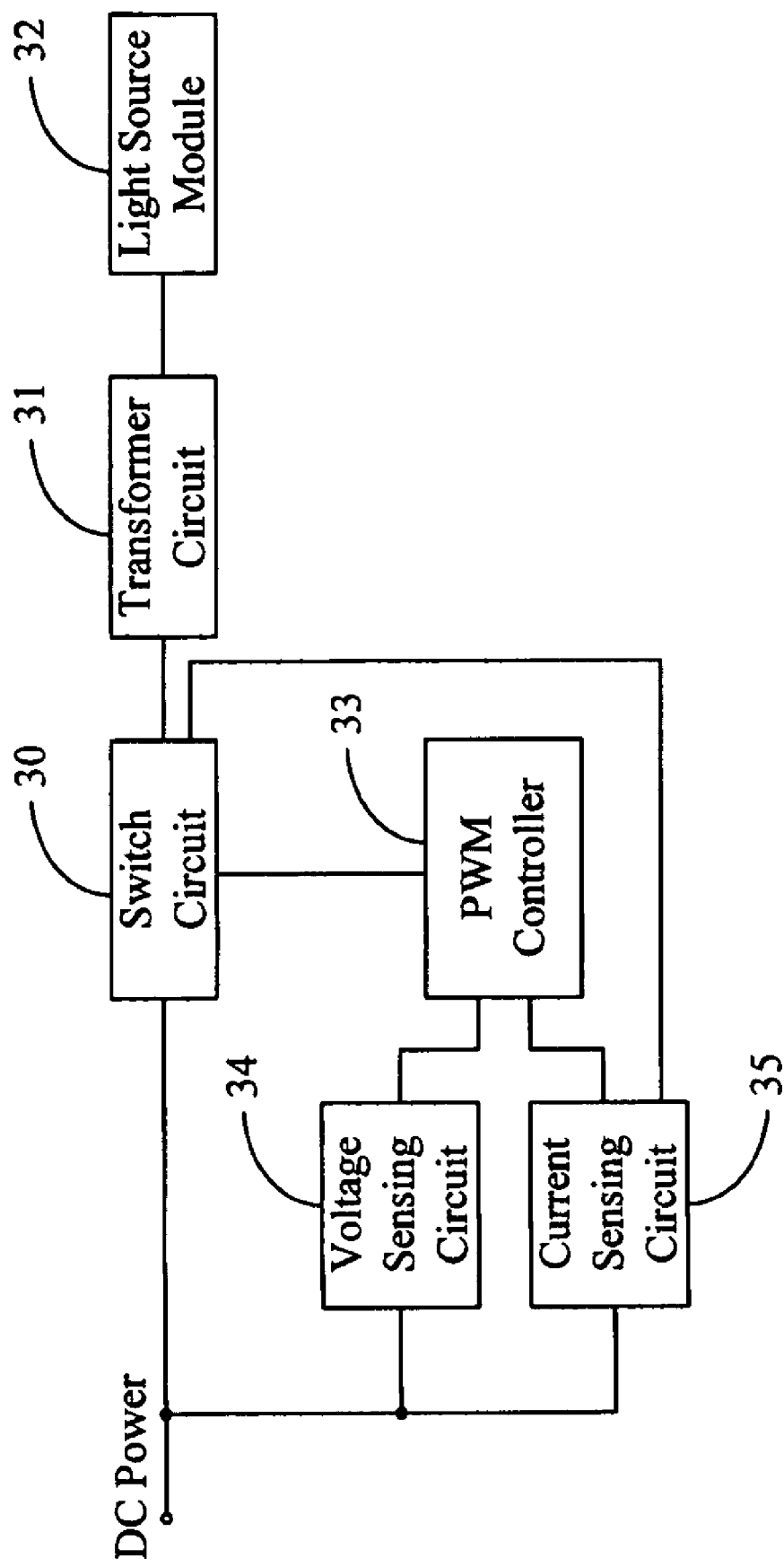
FIG. 1 is a block diagram of a driving device of an exemplary embodiment of the present invention.

FIG. 1 is a block diagram of a driving device of an exemplary embodiment of the present invention. The driving device includes a switch circuit 30, a transformer circuit 31, a light source module 32, a PWM controller 33, and a sensing circuit including a voltage sensing circuit 34 and a current sensing circuit 35.

The switch circuit 30 converts a received direct current (DC) power signal to an alternating current (AC) signal. The transformer circuit 31 transforms the AC signal to an appropriate signal to drive the light source module 32. In the exemplary embodiment, the AC signal output from the switch circuit 30 is a square-wave signal, and the signal output from the transformer circuit 31 is a sine-wave signal.

The voltage sensing circuit 34 receives the DC power signal, and senses a voltage level of the DC power signal. The current sensing circuit 35 receives the DC power signal, and senses a current level of the DC power signal. The PWM controller 33 controls the AC signal output from the switch circuit 30 according to the sensed voltage and current levels. The PWM controller 33 ensures a correct amount of power is provided to the light source 32.

The current sensing circuit 35 is also connected to the switch circuit 30, forming a current loop.

Figure 2:
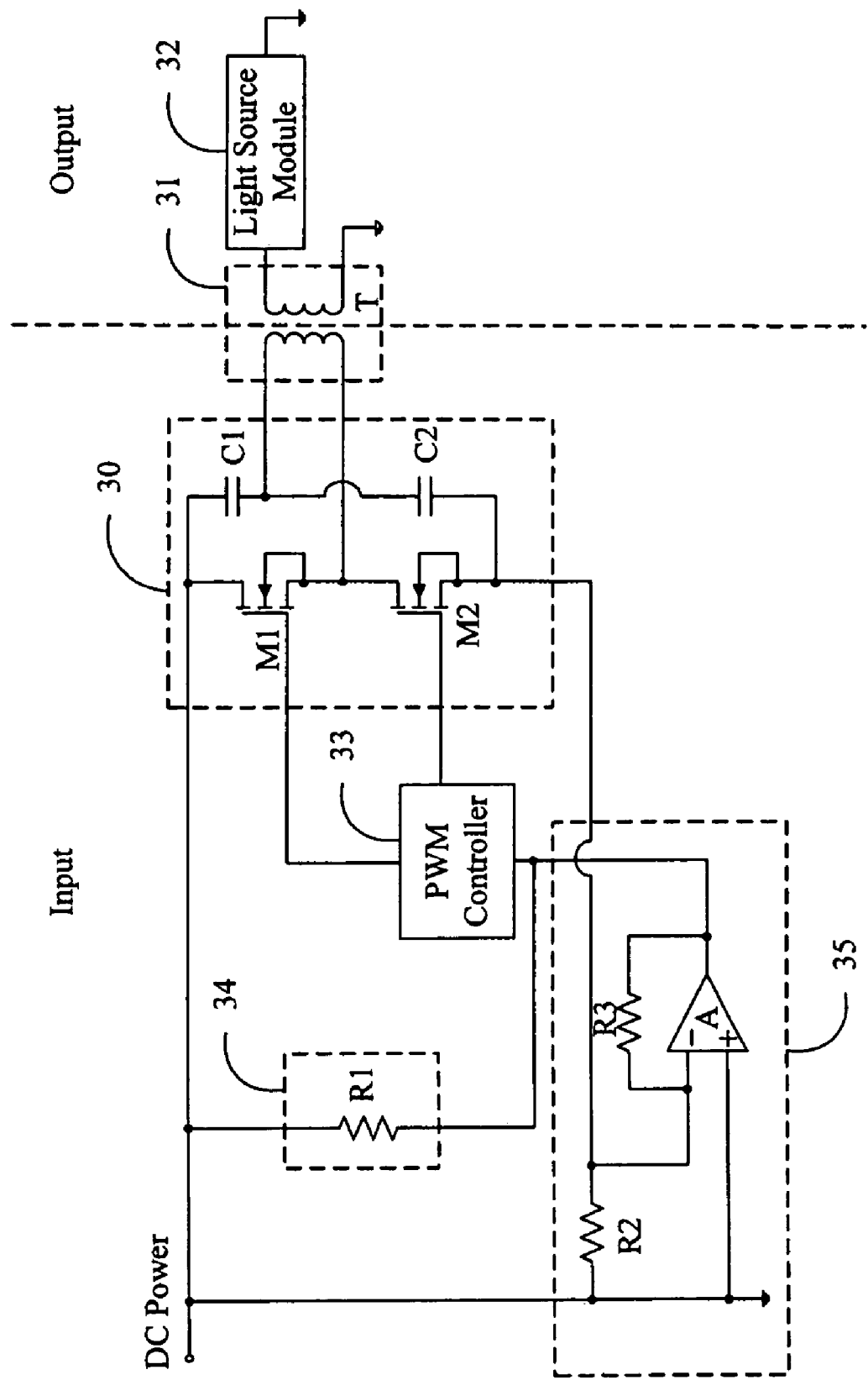
FIG. 2 is a detailed circuit diagram of FIG. 1.
Figure 3:
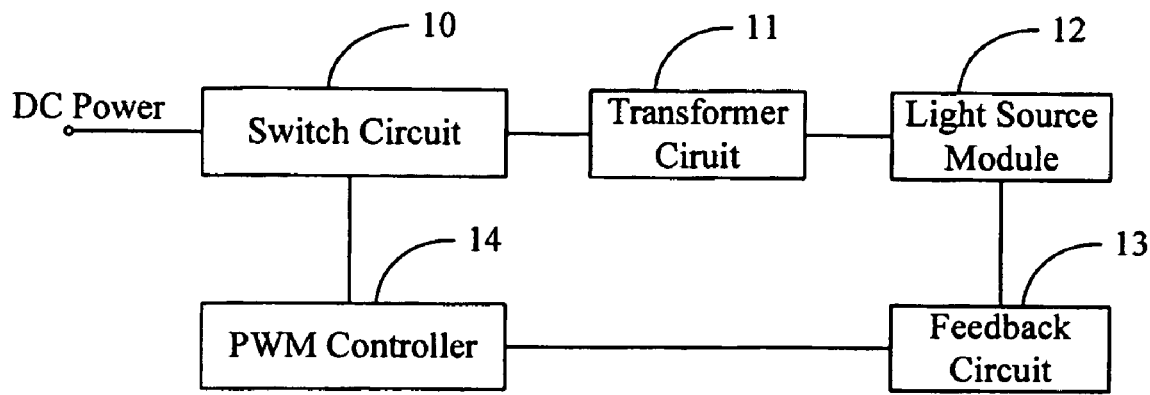
FIG. 3 is a block diagram of a conventional driving device.
Figure 4:
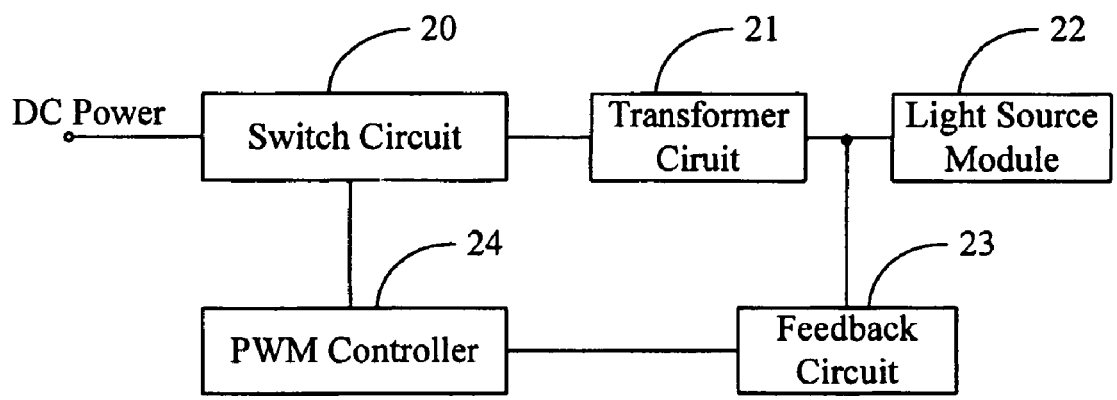
FIG. 4 is a block diagram of another conventional driving device.

FIG. 2 is a detailed circuit diagram of FIG. 1. The transformer circuit 31 includes a transformer T including a primary winding and a secondary winding. The primary winding of the transformer T is connected to the switch circuit 30. One end of the secondary winding of the transformer T is connected to the light source module 32, and the other end is grounded. In the exemplary embodiment, a left part of a dashed line is defined as an input circuit of the driving device, and a right part of the dashed line is defined as an output circuit of the driving device.

The switch circuit 30 comprises transistors M1 and M2 and capacitors C1 and C2. In the exemplary embodiment, the transistors M1, M2 are main switch components, forming a half-bridge circuit. The transistors M1, M2 are Metal-Oxide-Semiconductor Field Effect Transistor (MOSFETs). Each of the MOSFET M1, M2 includes a source, a drain and a gate.

The capacitor C1 is connected between a drain of the MOSFET M1 and an end of the primary winding of the transformer T, and the capacitor C2 is connected between the source of the MOSFET M2 and the end of the primary winding of the transformer T. The source of the MOSFET M1 and the drain of the MOSFET M2 are jointly connected to another end of the primary winding of the transformer T. The gates of the MOSFET M1, M2 are respectively connected to the PWM controller 33.

In alternative embodiment, the switch circuit 30 can be a full-bridge circuit, a push-pull circuit, or a royer circuit.

The voltage sensing circuit 34 includes a voltage sensing resistor R1, connected between the drain of the MOSFET M1 and the PWM controller 33, for sensing the voltage level of the DC power signal. The sensed voltage level is then outputted to the PWM controller 33.

The current sensing circuit 35 includes a current sensing resistor R2, an amplifier A, and a resistor R3. The current sensing resistor R2 is connected between the source of the MOSFET M2 and the ground, for sensing the current level of the DC power signal. The amplifier A includes a positive input, a negative input, and an output. The positive input of the amplifier A is grounded; the negative input of the amplifier A is connected to the source of the MOSFET M2, and the output of the amplifier A is connected to the PWM controller 33. The resistor R3 is connected between the negative input of the amplifier A and the output of the amplifier A.

Because the of the relatively large current of the DC power signal, and in order to avoid power loss on the current sensing resistor R2, value of the current sensing resistor R2 is relatively small. In the exemplary embodiment, the current sensing resistor R2 is substantially 0.025Ω. The amplifier A amplifies the sensed current, and then transmits the amplified current to the PWM controller 33.

The PWM controller 33 regulates duty cycle of PWM wave output therefrom according to the sensed voltage and current levels, and then respectively controls on/off time of the MOSFET M1, M2. Therefore, the AC signal output from the switch circuit 30 is controlled, and the power input of the driving device is steady.

In the present invention, the sensed voltage and the current levels are received from the input circuit of the driving device, which decreases costs of an electronic device using the driving device depicted in the present invention. In addition, the current of an output of the light source module 32 is steady, thereby precision of feedback current is ensured.

While embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

We claim:

1. A driving device for driving a light source module, the driving device comprising:
    a switch circuit for converting a received direct current (DC) power signal to an alternating current (AC) signal;
    a transformer circuit for transforming the AC signal to an appropriate signal output to drive the light source module;
    a voltage sensing circuit for receiving the DC power signal and sensing a voltage level of the DC power signal;
    a current sensing circuit for receiving the DC power signal and sensing a current level of the DC power signal; and
    a pulse width modulation (PWM) controller for controlling the AC signal output from the switch circuit according to the sensed voltage and current levels;
    wherein the signal output from the transformer circuit is a sine-wave signal.

2. The driving device as claimed in claim 1, wherein the current sensing circuit is connected to the switch circuit, forming a current loop.

3. The driving device as claimed in claim 1, wherein the AC signal output from the switch circuit is a square-wave signal.

4. The driving device as claimed in claim 1, wherein the transformer circuit comprises a transformer comprising a primary winding and a secondary winding; the primary winding is connected to the switch circuit; one end of the secondary winding is connected to the light source module; and the other end of the secondary winding is grounded.

5. The driving device as claimed in claim 4, wherein the switch circuit comprises:
    a first Metal-Oxide-Semiconductor Field Effect Transistor (MOSFET) having a source, a drain, and a gate; wherein the gate of the first MOSFET is connected to the PWM controller;
    a second MOSFET having a source, a drain, and a gate; wherein the gate of the second MOSFET is connected to the PWM controller, and the drain of the second MOSFET is connected to the source of the first MOSFET;
    a first capacitor connected between the drain of the first MOSFET and one end of the primary winding of the transformer; and
    a second capacitor connected between the source of the second MOSFET and said one end of the primary winding of the transformer;
    wherein the first MOSFET and the second MOSFET form a half-bridge circuit, and the source of the first MOSFET and the drain of the second MOSFET are jointly connected to another end of the primary winding of the transformer.

6. The driving device as claimed in claim 5, wherein the voltage sensing circuit comprises a voltage sensing resistor, connected between the drain of the first MOSFET and the PWM controller.

7. The driving device as claimed in claim 5, wherein the current sensing circuit comprises a current sensing resistor, connected between the source of the second MOSFET and ground.

8. The driving device as claimed in claim 7, wherein the current sensing circuit comprises:
    an amplifier having a positive input, a negative input, and an output; wherein the positive input is grounded; the negative input is connected to the source of the second MOSFET; and the output is connected to the PWM controller; and
    a resistor connected between the negative input and the output.

9. The driving device as claimed in claim 5, wherein a value of the current sensing resistor is substantially 0.025Ω.

10. A device for driving a light source module, the device comprising:
    a switch circuit for inputting power signals from a power source and converting said power signals for output;
    a transformer circuit electrically connected between said switch circuit and a light source module for transforming said converted power signals from said switch circuit and driving said light source module by means of said transformed power signals;
    a sensing circuit electrically connected with said switch circuit at an input side thereof for retrieving voltage and current information about said input power signals of said switch circuit; and
    a controller electrically connected between said switch circuit and said sensing circuit for controlling said output of said converted power signals of said switch circuit according to said retrieved information;
    wherein said transformed power signals are sine-wave signals.

11. The device as claimed in claim 10, wherein said sensing circuit comprises a circuit for sensing a voltage level of said power signals and another circuit for sensing a current level of said power signals.

12. A driving device for driving a light source module, the device comprising:
    a switch circuit for converting a received direct current (DC) power signal to an alternating current (AC) signal;
    a transformer circuit for transforming the AC signal to an appropriate signal output to drive the light source module, wherein the transformer circuit comprises a transformer comprising a primary winding and a secondary winding; the primary winding is connected to the switch circuit; one end of the secondary winding is connected to the light source module; and the other end of the secondary winding is grounded;

a voltage sensing circuit for receiving the DC power signal and sensing a voltage level of the DC power signal;

a current sensing circuit for receiving the DC power signal and sensing a current level of the DC power signal; and a pulse width modulation (PWM) controller for controlling the AC signal output from the switch circuit according to the sensed voltage and current levels.

13. The driving device as claimed in claim 12, wherein the switch circuit comprises:

a first Metal-Oxide-Semiconductor Field Effect Transistor (MOSFET) having a source, a drain, and a gate; wherein the gate of the first MOSFET is connected to the PWM controller;

a second MOSFET having a source, a drain, and a gate; wherein the gate of the second MOSFET is connected to the PWM controller, and the drain of the second MOSFET is connected to the source of the first MOSFET;

a first capacitor connected between the drain of the first MOSFET and one end of the primary winding of the transformer; and a second capacitor connected between the source of the second MOSFET and said one end of the primary winding of the transformer;

wherein the first MOSFET and the second MOSFET form a half-bridge circuit, and the source of the first MOSFET and the drain of the second MOSFET are jointly connected to another end of the primary winding of the transformer.

14. The driving device as claimed in claim 13, wherein the voltage sensing circuit comprises a voltage sensing resistor, connected between the drain of the first MOSFET and the PWM controller.

15. The driving device as claimed in claim 13, wherein the current sensing circuit comprises a current sensing resistor, connected between the source of the second MOSFET and ground.

16. The driving device as claimed in claim 15, wherein the current sensing circuit comprises:

an amplifier having a positive input, a negative input, and an output; wherein the positive input is grounded; the negative input is connected to the source of the second MOSFET; and the output is connected to the PWM controller; and a resistor connected between the negative input and the output.

17. The driving device as claimed in claim 13, wherein a value of the current sensing resistor is substantially 0.05Ω.

* * * * *